UNITED STATES PATENT OFFICE.

F. BEARSE AND G. E. HOPKINS, OF BARNSTABLE, MASSACHUSETTS.

IMPROVED COMPOSITION FOR ROOFING.

Specification forming part of Letters Patent No. 58,975, dated October 23, 1866.

*To all whom it may concern:*

Be it known that we, FRANKLIN BEARSE and GEORGE E. HOPKINS, of the town and county of Barnstable, and State of Massachusetts, have invented a new and useful Composition for Covering Roofs or other Surfaces; and we do hereby declare the same and the mode of compounding it to be as follows:

In making such composition we take twenty gallons of coal-tar, sixty gallons of sand or an earthy material, and one pound of oxalic acid, the latter to be dissolved in water sufficient to effect its dissolution. These ingredients we mix and stir together until they are thoroughly incorporated.

We do not confine our invention to the exact proportions of its ingredients as hereinbefore given, as they may be somewhat varied without materially affecting the result.

We can add to this mixture an ocher or other coloring material, according to the color we may desire to impart to it.

We are aware that sand or its earthy equivalent and coal-tar have been used before our invention in making roofing compositions; therefore we do not claim such; but we have found that by combining therewith a small amount of oxalic acid we are enabled to cause the compound to dry or harden quicker, and to become much harder than it will without the acid. We have also discovered that it is very much improved in other respects by the acid.

We claim, therefore—

The composition as made of the acid and other ingredients, substantially as hereinbefore set forth.

FRANKLIN BEARSE.
GEORGE E. HOPKINS.

Witnesses:
ADA BAXTER,
LYDIA B. HALLETT.